United States Patent Office 3,752,832
Patented Aug. 14, 1973

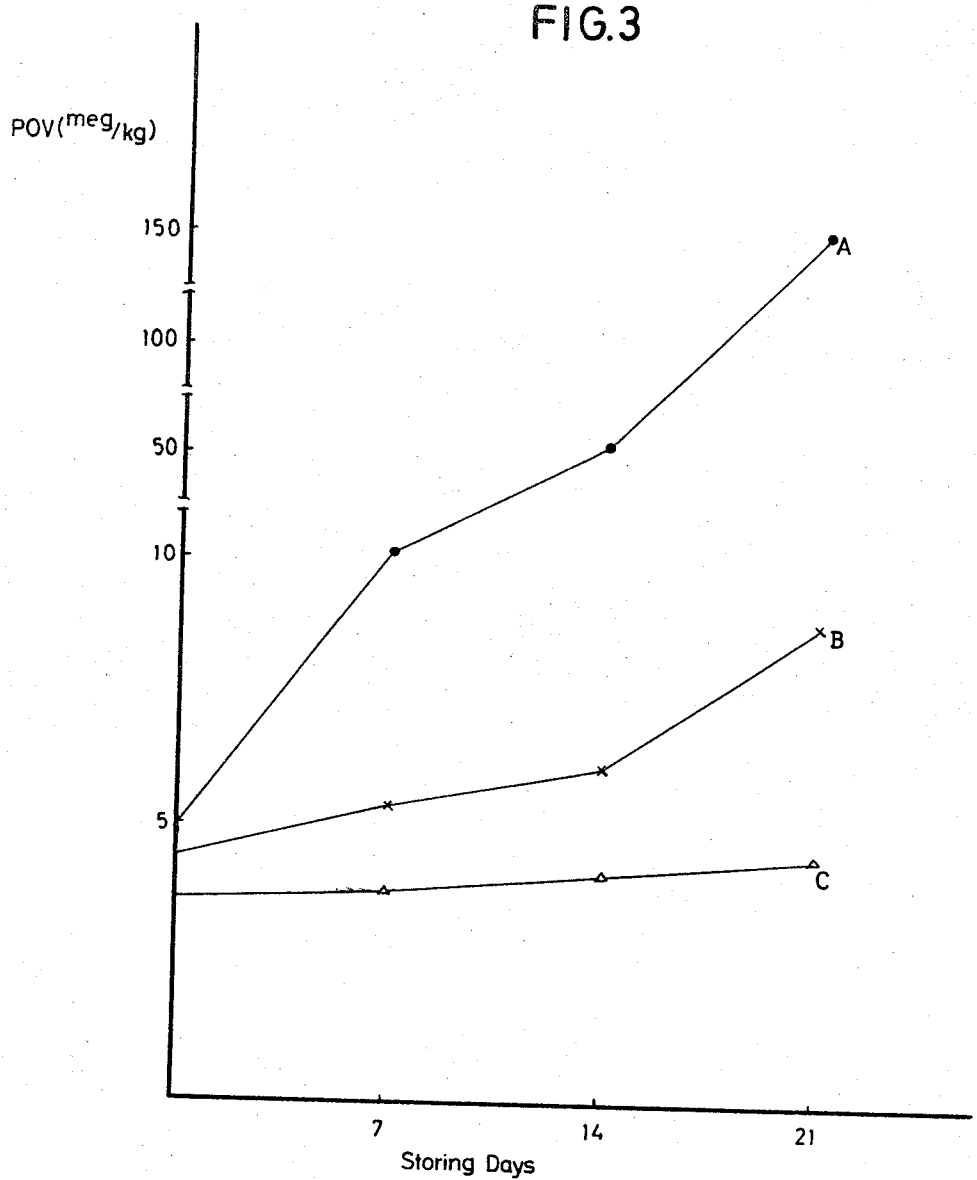

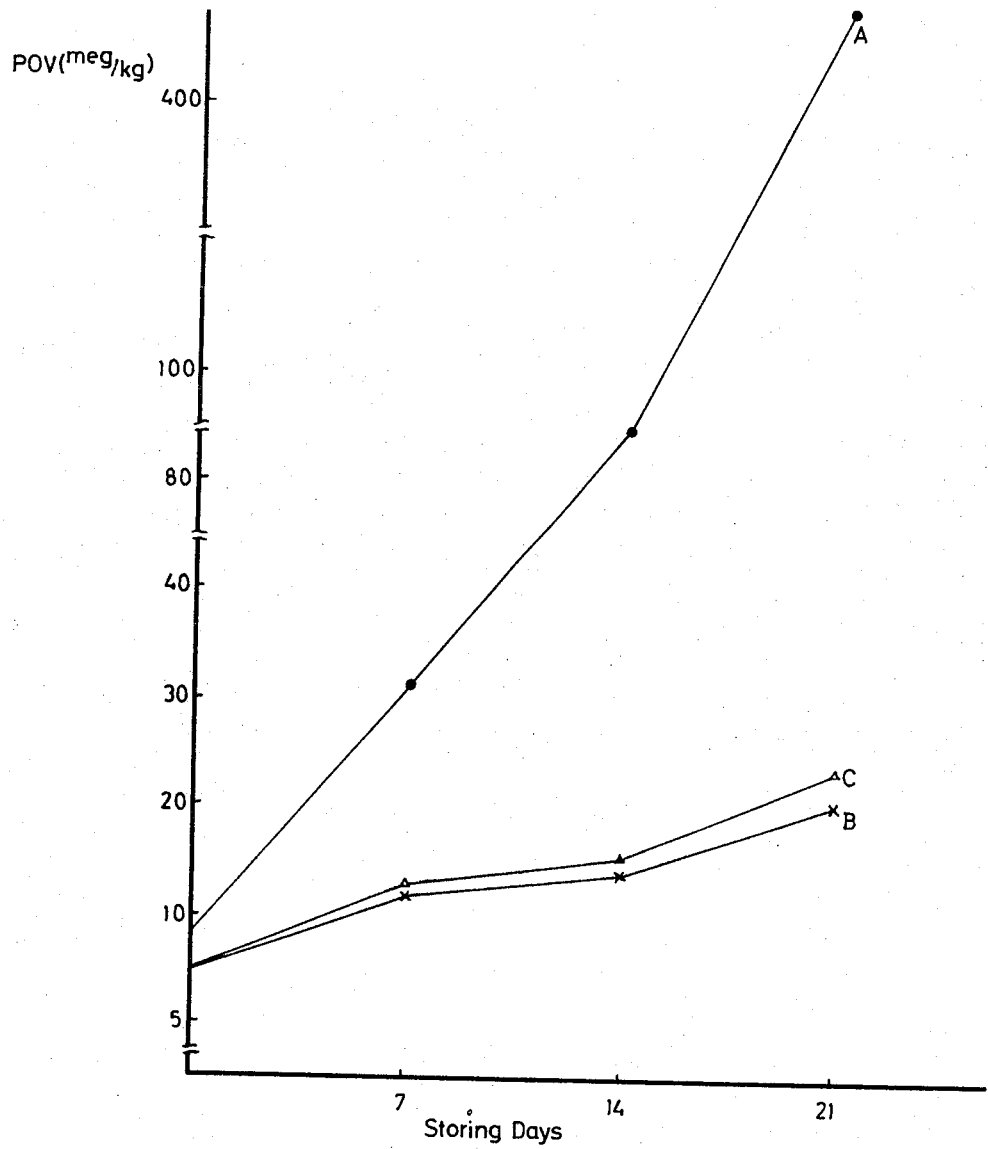

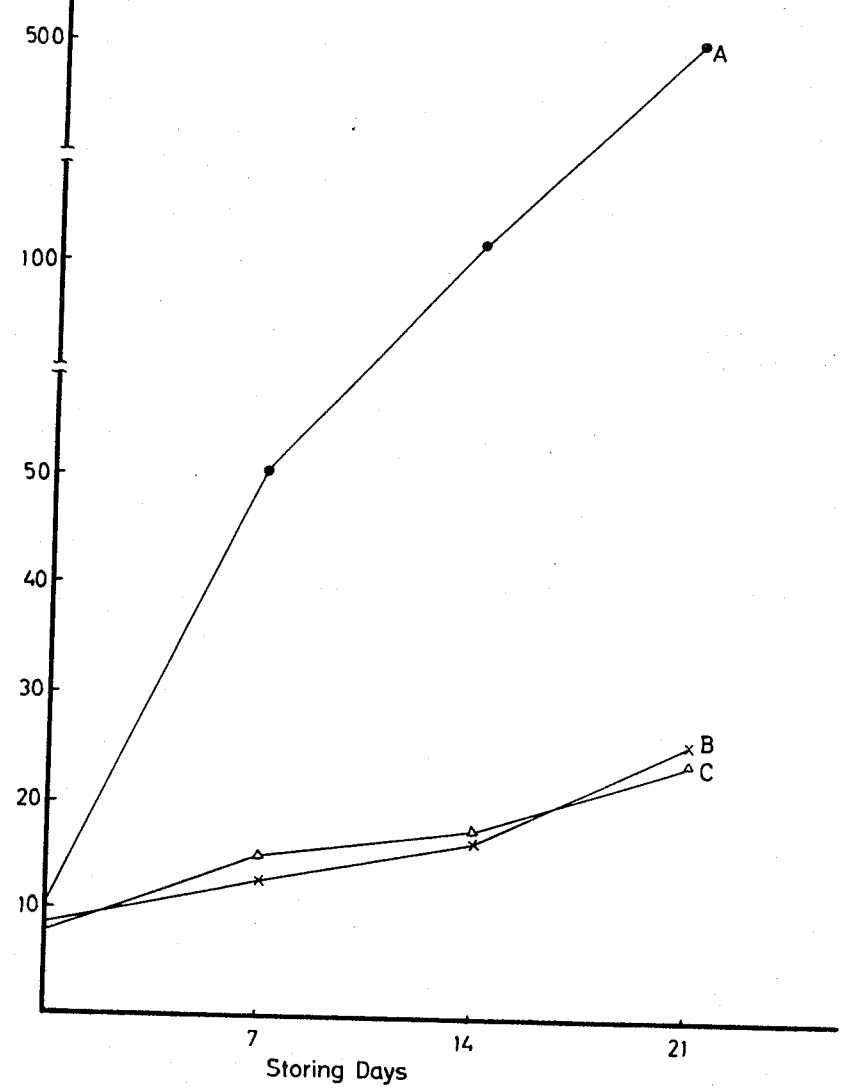

3,752,832
PROCESS FOR ANTI-OXIDATION AGAINST LIPID
Sadanobu Maruyama and Tsueno Wakayama, Tokyo, Japan, assignors to Kongo Yakuhin Kabushiki Kaisha, Toyama-ken, Japan
Filed Sept. 3, 1971, Ser. No. 177,758
Claims priority, application Japan, Sept. 8, 1970, 45/78,633; Dec. 11, 1970, 45/109,726
Int. Cl. C11b 5/00
U.S. Cl. 260—398.5  5 Claims

ABSTRACT OF THE DISCLOSURE

Process for anti-oxidation against lipid characterized in permitting co-existence of tocopherol and unsaponifiable matter of rice oil against said lipid.

---

The present invention relates to a process for stabilizing lipid against oxidation. The invention makes use of the effect caused by tocopherol and unsaponifiable matter of rice oil or tocopherol, unsaponifiable matter of rice oil and synergist.

Lipids with respect to the present invention include not only those contained in edibles but also those in cosmetics and other various kinds of articles.

The present invention relates also to a process for preventing discoloration of coloring matters and the like utilizing synergism of tocopherol and unsaponifiable matter of rice oil or tocopherol, unsaponifiable matter of rice-bran and synergist.

Coloring matter, for the purposes of the present invention, refers to coloring matter to be used in edibles as well as in cosmetics and other environments.

At present, in order to restrain oxidation of lipid, for example, in instant fried vermicelli, it has been proposed mainly to use an antioxidant made from the chemical compound of BHA or BHT. However, it is not desirable to utilize such antioxidant for the above-mentioned purpose from the general standpoint of hygienical security. Attempts have been made to find some natural substance to serve as antioxidant in place of a chemical antioxidant. In particular, it would be desirable to select a naturally occurring substance which eliminates the drawbacks pf the known antioxidants referred to. However, this has proved difficult in the light of the efficiency for anti-oxidation of BHA and BHT as well as the economical considerations involved.

The present invention overcomes successfully the foregoing problem. After serious research on antioxidants made from natural products or substances it has been ascertained that unsaponifiable matter of rice oil (trademark Naocon) and tocopherol if used together with each other have a remarkable effect in imparting lipids with heat resisting property in addition to anti-oxidation equal to BHA and BHT under the effect of synergism. Their use is also exceedingly economical. Furthermore the effect of anti-oxidation for animal oil and fat such as lard and the like as well as vegetable oil and fat is increased by additionally using a synergist.

Unsaponifiable matter of rice oil described above according to the present invention includes not only crude products but also refined products and tocopherol comprises $\alpha$, $\beta$, $\gamma$ and $\delta$ tocopherols or mixtures thereof.

The quantities of unsaponifiable matter of rice oil and tocopherol may vary within wide limits, but it is desirable for the former to be added in the range of 0.01–2% calculated on the amount of lipid while for the latter a range of 0.01–15 is advantageous. The ratio between the unsaponifiable matter of rice oil and the tocopherol is preferable in the range of 1 to 10–0.1.

As synergists may be used citric acid, ascorbic acid and their salts or esters, isoascorbic acid, phosphoric acid, condensed phosphate, cephalin and tartaric acid. Among them citric acid is most effective for vegetable lipid (such as cooking oil or margarine) whereby it is formed in a stable chelate compound with calcium, iron and nickel causing these trace metal to become inactive. Ascorbic acid and salt thereof, ester (VC palmitate and VC stearate) and physiologically inactive iso-ascorbic acid (erythorbic acid, 2-ascorbic acid) are effective as the foregoing and are particularly excellent synergists in phenolic anti-oxidants. Vitamin C is good for lactic liquid, powdery cereals and fatty fishes. Besides the foregoing as good synergist, phosphoric acid and condensed phosphate are good for maintaining the hue and color of edibles. Moreover, the effects of cephalin and tartaric acid of phosphatide containing N which are found in brain cells, nervous tissues and the yoke of an egg have been considered suitable. In recent years, a very good effect of salts of cytracon (methyl maleic acid and phitinic acid—salt of inomitol—hexaphosphoric-Ca-Mg) was found (to be described hereinafter).

According to the present invention, it has been found that unsaponifiable matter of rice oil itself acts as antibacterial substance against certain kind of bacilli.

Furthermore, it is a notable merit of the present invention to make use of the property of the mixture of unsaponifiable matter of rice oil and tocopherol for prefading of the pigment of natural or compound edibles such as vitamin $B_2$, chlorophyll and others.

Antioxidants made from unsaponifiable matter of rice oil, tocopherol and synergist according to the present invention exert high anti-oxidation power against lipid not only in heat treatment, but also in low temperature treatment (refrigeration) thereby. They have thus proved to be useful as stabiliser for refrigerated edibles.

The present invention will now be described in detail with reference to the accompanying drawings by way of examples in a form of embodiments wherein:

FIG. 3 shows stability in lipid of instant larmen by means of antioxidant addition, indicating age changing test of sample immediately after being fried.

Figure 1:
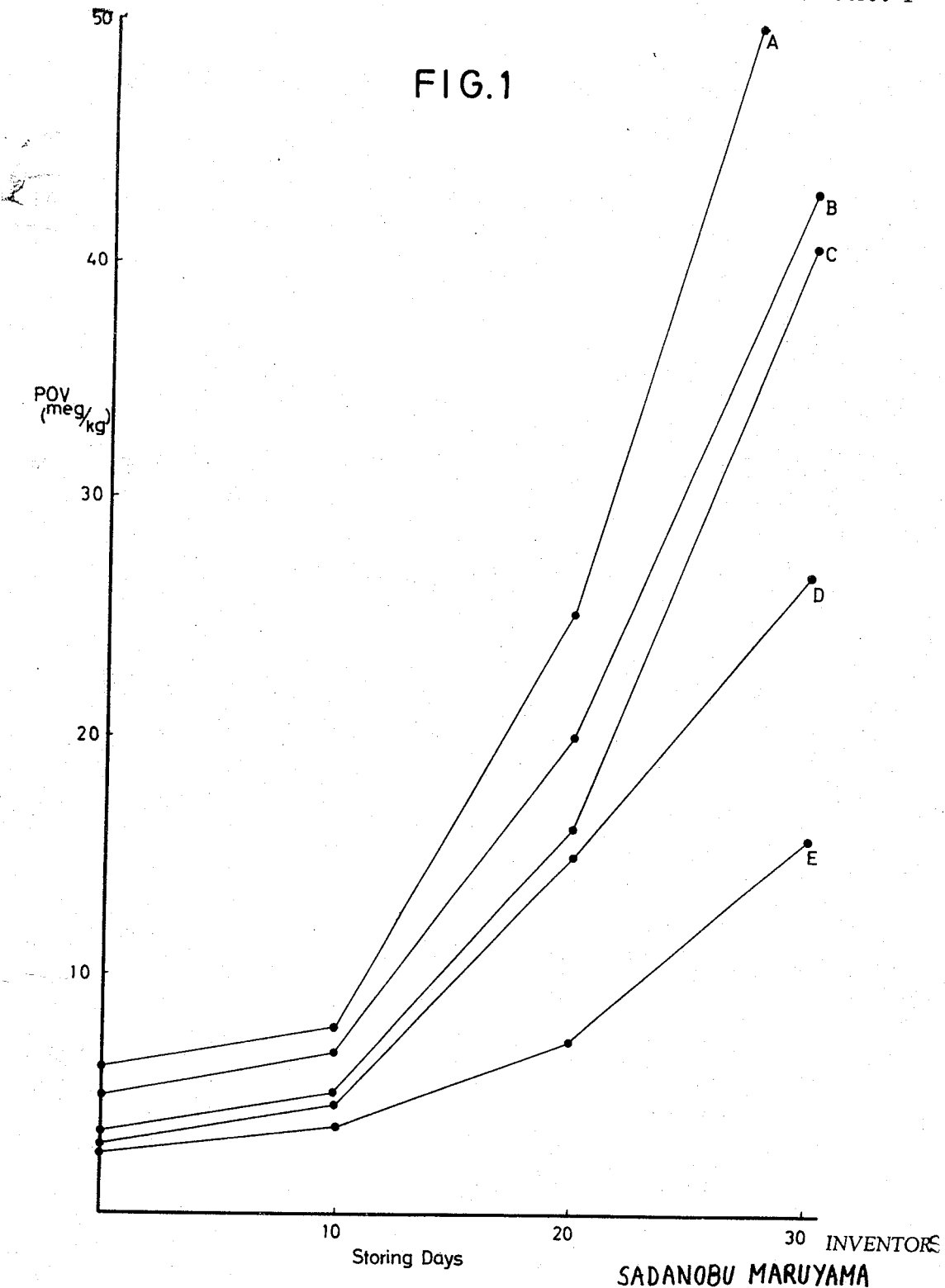
FIG. 1 is a diagram showing the stability (40° C.) of lipid of instant larmen (instant fried vermicelli) by adding Naocon, serving as an inhibitor against oxidation, to rice oil, A section: Comparison, B section: Tocopherol,
C section: Naocon, D section: BHA·BHT and
E section: Naocon S·tocopherol.

FIG. 4 shows stability in lipid of instant larmen by means of purifying deterioration inhibitor, indicating age changing test of fried sample after 5 hours in heated oil bath and FIG. 5 shows the same stability as mentioned above FIGS. 3 and 4, indicating age changing test of fried sample in reheated oil bath after heating for 5 hours and subsequently left to cool for 24 hours. In each drawing, A means comparison, B represents tocopherol, Naocon and C indicates BHA·BHT, the numerals on the horizontal line denote preserving duration by day respectively.

EXAMPLE 1

Test sample to be used:
Instant fried vermicelli, genuine lard (standard quality passed through JAS inspection) and rice oil.
Antioxidant to be applied:
Unsaponifiable matter of rice oil, tocopherol, synergist, BHA and BHT.
The quantity of antioxidant added to oil and fat:

|   | Percent | |
|---|---|---|
|   | Unsaponifiable matter of rice oil | Tocopherol |
| 1 | 0.2 | 0.05 |
| 2 | 0.1 | 0.025 |
| 3 | 0.05 | 0.025 |
| 4 | 0.04 | 0.01 |
| 5 | 0.02 | 0.025 |
| 6 | 0.02 | 0.005 |
|   | BHA.BHT | |
| 7 | (1:1) 0.04 | |
| 8 | (¹) | |

¹ No addition.

|   | Percent | | |
|---|---|---|---|
|   | Unsaponifiable matter of rice oil | Tocopherol | Synergist |
| 9 | 0.1 | 0.025 | 0.01 |
| 10 | 0.04 | 0.01 | 0.01 |
| 11 | 0.02 | 0.005 | 0.01 |
| 12 |  | 0.05 |  |
| 13 | 0.2 |  |  |

Category of test:
Peroxide value (POV)
Functional test (lustre of colour, scent, condition)
Content of unsaponifiable matter of rice oil, tocopherol.

Test conditions:
The test samples are two kinds of fried vermicelli. Both are fried in oil after having been immersed in the oil under a continuous heat-treatment of 5 hours. One of the samples was treated in the oil containing the said antioxidant, while the other was treated in oil without antioxidant. After the frying, each sample is put to the peroxide value measurement test and the odor-color-taste test four times respectively. The first tests are made immediately after the frying, whereafter the samples are kept at a constant temperature of 40° C. The second, third and the fourth tests are made after 10 days, 20 days and 30 days after the first tests.
Result of test:

| | | Kind of oil—Rice oil | | | | | | |
|---|---|---|---|---|---|---|---|---|
| | | Preserving period of duration | | | | | | |
| Mark | Ratio of sample and antioxidant | 9/14 (Sept. 14) 0 day | 9/24 (Sept. 24) 10 days | Function | 10/5 (Oct. 5) 20 days | Function | 11/4 (Nov. 4) 30 days | Function |
| 1-8 | Comparison | 5.72 | 7.68 | Good | 22.0 | Good | 46.6 | Smell a little. |
| 1-7 | 0.04% BHA:BHT (1:1) | 5.42 | 5.66 | do | 17.0 | do | 29.9 | Do. |
| 1-1 | 0.2% Naocon; 0.05% tocopherol | 4.08 | 6.59 | do | 24.9 | do | 49.4 | Do. |
| 1-2 | 0.1% Naocon; 0.025% tocopherol | 3.92 | 5.42 | do | 17.3 | do | 39.2 | Do. |
| 1-3 | 0.05% Naocon; 0.025% tocopherol | 4.66 | 4.48 | do | 17.3 | do | 40.7 | Do. |
| 1-4 | 0.04% Naocon; 0.01% tocopherol | 4.42 | 8.01 | do | 27.1 | do | 53.6 | Do. |
| | | 9/16 (Sept. 16) | 9/26 (Sept. 26) | | 10/6 Oct. 6) | | 10/16 (Oct. 16) | |
| 2-5 | 0.02% Naocon; 0.025% tocopherol | 2.13 | 4.80 | Good | 14.6 | Good | 39.6 | Do. |
| 2-6 | 0.02% Naocon; 0.005% tocopherol | 2.90 | 5.94 | do | 18.0 | do | 40.0 |  |
| 2-9 | 0.1% Naocon; 0.025% tocopherol; 0.01% synergist | 2.84 | 4.12 | do | 8.04 | do | 17.8 | Good. |
| 2-10 | 0.04% Naocon; 0.01% tocopherol 0.01% synergist | 2.71 | 4.67 | do | 9.34 | do | 22.4 | Do. |
| 2-11 | 0.02% Naocon; 0.005% tocopherol; 0.01% synergist | 2.43 | 4.05 | do | 10.1 | do | 24.5 | Do. |
| 2-12 | 0.05% tocopherol | 3.73 | 5.48 | do | 17.5 | do | 42.5 | Smell a little: |
| 2-13 | 0.2% Naocon | 2.41 | 6.28 | do | 21.9 | do | 51.0 | Do. |

NOTE.—Rice oil 0.37 meq./kg.

| | Kind of oil—Lard | | | | | | |
|---|---|---|---|---|---|---|---|
| Mark | 9/17 (Sept. 17) 0 day | 9/28 (Sept. 28) 10 days | Function | 10/7 (Oct. 7) 20 days | Function | 10/17 (Oct. 17) 30 days | Function |
| 3-8 | 16.5 | 631.0 | Strong smell | 934.0 | Strong smell | 1039.0 | Strong smell. |
| 3-7 | 17.8 | 23.7 | Good | 24.5 | Good | 31.5 | Good. |
| 3-1 | 12.8 | 17.8 | do | 18.1 | do | 22.1 | Do. |
| 3-2 | 16.1 | 22.0 | do | 24.1 | do | 34.1 | Do. |
| 3-3 | 15.6 | 24.9 | do | 30.9 | do | 56.7 | Smell a little. |
| 3-4 | 15.8 | 39.2 | do | 274.0 | Strong smell | 749.0 | Strong smell. |
| | 9/18 (Sept. 18) | 9/28 (Sept. 28) | | 10/8 (Oct. 8) | | 10/19 (Oct. 8) | |
| 4-5 | 12.5 | 24.2 | do | 31.5 | Good | 59.3 | Smell a little. |
| 4-6 | 16.8 | 348.0 | Strong smell | 684.0 | Strong smell | 784.0 | Strong smell. |
| 4-9 | 17.0 | 20.8 | Good | 21.1 | Good | 26.4 | Good. |
| 4-10 | 18.2 | 29.4 | do | 34.4 | Smell a little | 151.5 | Smell a little. |
| 4-11 | 18.2 | 57.4 | Smell a little | 536.0 | Strong smell | 683.0 | Strong smell. |
| 4-12 | 14.8 | 20.5 | Good | 21.0 | Good | 22.3 | Good. |
| 4-13 | 12.4 | 26.4 | do | 51.8 | Smell a little | 94.4 | Smell a little. |

NOTE.—Lard 1.28 meq./kg.

Figure 2:
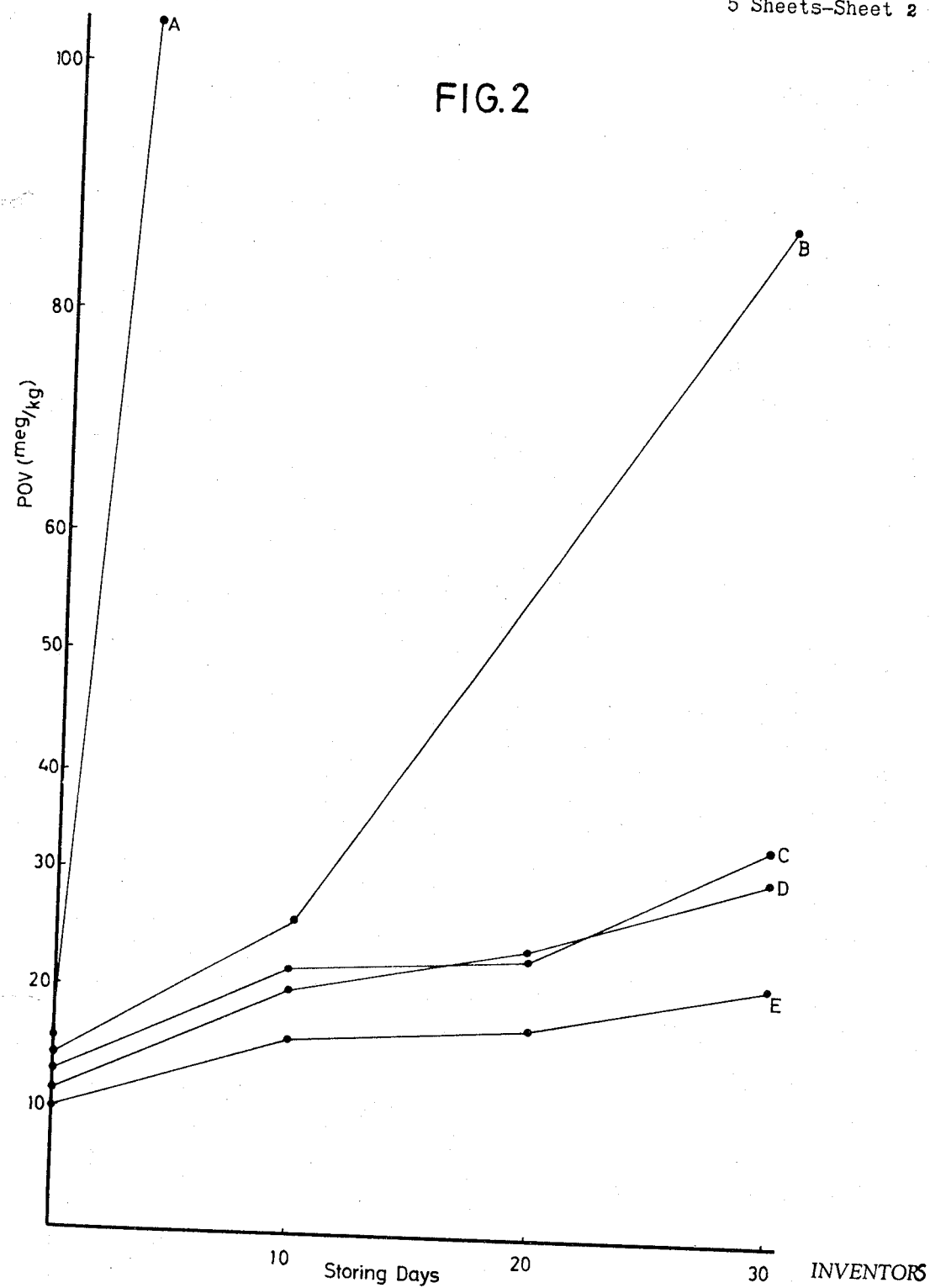
FIG. 2 is a diagram showing the stability of lipid of instant larmen by adding to lard Naocon serving as an inhibitor against oxidation, A section: Comparison, B section: Naocon,
C section: Tocopherol, D section: BHA·BHT, and
E section: Naocon S·tocopherol.

The result listed in the above is shown corresponding diagrams illustrated in FIGS. 1 and 2 respectively.

EXAMPLE 2

Test sample to be used:
Instant fried vermicelli, genuine lard (standard grade defined by JAS)
Antioxidant to be applied:
Mixture of unsaponifiable matter of rice oil and tocopherol, additive quantity of each of which is 0.2% and 0.05%. Mixture of BHA and BHT at the rate of 400 p.p.m. 1 to 1 of additive quantity.
Category of test:
Peroxide value (POV)
Functional test (lustre of colour, scent and condition)
Content of unsaponifiable matter of rice oil and tocopherol.
Test conditions:
The two kinds of instant fried vermicelli which served as samples are separately placed in lard baths. One of the lard baths contains the said antioxidant while the other lard bath is devoid of antioxidant. After the immersion in the baths, the samples are fried well in the respective lard bath for 3 minutes at the temperature of 145±3° C. The peroxide value measurement test and the odor-color-taste test are made immediately after the frying of the samples, and under constant temperature and humidity conditions. The samples are then inspected for POV and are appraised for function.
Test for variation of lapsed time is carried out under the following three different conditions with the constant temperature at 40° C., constant temperature (RH 60%) resulting in the data listed on the following table.
Referring to stability of lipid in instant larmen by adding anti-degrading agent composed of unsaponifiable matter of rice oil and tocopherol.

lated with the test bacteriae and then brought into contact with the solution of the sample to be tested—unsaponifiable matter of rice bran oil—on the one hand, and with the contrastive samples of antibiotics—streptomycin, etc. The antibiotic efficiency of the test sample is compared with that of the contrastive samples on the basis of the arresting activity in respect of the development of the cultured bacteriae in the several areas of the culture medium where the diffusion of the two different kinds of samples of antibiotic substances is already in progress.

Nephelometer test:
Bouillon used in this test is preliminarily prepared with a consistency twice as thick as ordinary bouillon. The bouillon is then subjected to a high-pressure sterilization for 15 minutes at the temperature of 120° C. After cooling, the bouillon is added to the solution of the test sample and to the contrastive samples, respectively, in the same quantity as in the case of the culture medium in germfree conditions. A drop of water with floating bacteriae, as above-mentioned, is then added. The antibiotic efficiency of the test sample is compared with that of the contrastive samples on the basis of the arresting activity in respect of the development of the bacteriae after a 24 hour culture period. The measurement of the development of the bacteriae is made with a photoelectric colorimeter.

The albuminous degeneration measurement in the culture medium was not applicable to the above tests since chloroform was a solvent for the samples to be tested, to wit, unsaponifiable matter of rice bran oil.

The present test mentioned in above process could not be carried out by way of the test through protein denaturation in the cultivation base due to existence of chloroform in the form of the solvent of unsaponifiable matter of rice oil.

The result of the test:
Circle of checking anti-bacterial substance through the process of diffusion:

| Sample | Reserving term of days | Oil solution—Lard solution | | | | | |
|---|---|---|---|---|---|---|---|
| | | 0 hour | | 5 hours | | 24 hours | |
| | | POV | Function | POV | Function | POV | Function |
| Comparison | 0 | 5.00 | Good | 8.11 | Good | 10.2 | Good. |
| | 7 | 10.9 | do | 31.2 | Not so good | 52.0 | No good. |
| | 14 | 55.0 | No good | 89.1 | No good | 138.0 | Do. |
| | 21 | 153.0 | do | 437.0 | do | 505.0 | Do. |
| Product according to the present invention [1] | 0 | 4.50 | Good | 7.34 | Good | 8.96 | Good. |
| | 7 | 5.50 | do | 11.8 | do | 13.0 | Do. |
| | 14 | 6.20 | do | 14.0 | do | 16.3 | Do. |
| | 21 | 7.80 | do | 20.6 | do | 25.7 | Do. |
| (BHA) and (BHT) | 0 | 3.74 | do | 7.43 | do | 8.00 | Do. |
| | 7 | 3.90 | do | 13.0 | do | 15.1 | Do. |
| | 14 | 4.23 | do | 15.4 | do | 17.9 | Do. |
| | 21 | 4.60 | do | 23.7 | do | 24.3 | Do. |

[1] Unsaponifiable matter of rice oil and tocopherol.

REMARKS.—"Not so good" set forth in function column of the above table means inferiority of scent, "no good" means strong bad smell caused by rancidity.

The result of test for anti-bacterial function caused by residue of unsaponifiable matter of rice oil (trademark name Naocon) is shown as follows:
Unsaponifiable matter of rice oil: 0.5%, 0.3%, 0.2%, 0.1%.
Comparative anti-bacterial substance:
Streptomycin, 100, 60, 40, 20 μg./ml.
Sodium benzoate, 0.5%, 0.3%, 0.2%, 0.1%.
Stock of bacteria to be tested:
*Micrococcus pyogeneo* var. *aurecus* PCI 1216
*Eschesichia coli* NIHJ
*Bacillus subtilis* PCI 219
Method of test: Diffusion:
A culture medium of agar-agar is preliminarily inocu-

UNSAPONIFIABLE MATTER OF RICE OIL

| Germ stock to be used | Percent | | | |
|---|---|---|---|---|
| | 0.5 | 0.3 | 0.2 | 0.1 |
| *Micrococcus pyogenes* var. *aureus* PCJ 1216 | (−) | (−) | (−) | (−) |
| *Escherichia coli* NIHJ | 22.0 | 18.0 | (−) | (−) |
| *Bacillus subtilis* PCI 219 | (−) | (−) | (−) | (−) |

STREPTOMYCIN

| Germ stock to be used | μg./ml. | | | |
|---|---|---|---|---|
| | 100 | 60 | 40 | 20 |
| *Micrococcus pyogenes* var. *aureus* PCI 1216 | 28.0 | 25.0 | 23.5 | 19.0 |
| *Escherichia coli* NIHJ | 28.5 | 27.0 | 26.0 | 25.0 |
| *Bacillus subtilis* PCI 219 | 35.0 | 30.0 | 29.0 | 27.0 |

SODIUM BENZOATE

| Germ stock to be used | Percent | | | |
|---|---|---|---|---|
| | 1.0 | 0.5 | 0.3 | 0.2 |
| *Micrococcus pyogenes* var. *aureus* PCI 1216 | 22.5 | 18.0 | 16.5 | (—) |
| *Escherichia coli* NIHJ | 21.9 | 18.0 | 15.0 | (—) |
| *Bacillus subtilis* PCI 219 | 18.5 | 16.3 | 13.5 | (—) |

NOTE.—(—) shows no function in check.

Nephelometry process:

It could not be carried out said process by way of the test through protein denaturation in the cultivation base due to existence of chloroform in the solvent of unsaponifiable matter of rice oil.

In the result of the foregoing test, no anti-bacterial property could be detected in the residue of unsaponifiable matter of rice oil against *Micrococcus pyogenes* var. *aureus* PCI 1216 as well as *Bacillus subtilis* PCI 219 while there is shown anti-bacterial property corresponding 18 g/m. of streptomycin and 1% of sodium benzoate against *Escherichia coli* NIHJ.

genous dispersion, about 2 g. of which is taken out to be transferred into a colorless schale having approx. 40 mm. of an inner diameter and approx. 20 mm. in height, and said schale is covered, then treated with isothermal drying at the temperature of 105° C. in open system chamber wherein every 20 minutes mixing is carried out, subsequently change of color tone is observed visually after 1 hour, 3 hours and 5 hours respectively which changing stage is photographed in Technicolor and is measured with colorimeter of Hander's color list system.

Stability test for ray of light is carried out in such a manner that, when it is fine weather, schale without cover is placed on a sheet of a white paper at the roof of a building, mixing is taken place at every 10 minutes, and change of color tone is measured after 3 hours, 4.5 hours and 10 hours respectively by shelf test.

Specimen solution is added and mixed with an aqueous solution of 5 ml. of pH 3.0, 5.0, 7.0 and 9.0 respectively, and then is added with hichrosuper cell of 10 g. in sufficient agitation, subsequently is measured its homogeneous dispersion, after 2 hours change of color tone is visually observed, said change is photographed in Technicolor and is measured by colorimeter of Hander's color list system.

1. Color tone caused by change of pH.

| Hue | | pH of— | | | | | | | | | | | | | | |
|---|---|---|---|---|---|---|---|---|---|---|---|---|---|---|---|---|
| | | 3.0 | | | | 5.0 | | | | 7.0 | | | | 9.0 | | |
| Coloring matter | Stablizer | L | a | b | Hue | L | a | b | Hue | L | a | b | Hue | L | a | b | Hue |
| c-Carotin | Comparison 2.9%. | 78.5 | 8.1 | 8.0 | 1 | 78.1 | 9.6 | 6.8 | 1 | 76.0 | 9.5 | 6.6 | 1 | 82.0 | 8.4 | 7.5 | 1 |
| Do | do | 78.6 | 12.9 | 14.1 | 3 | 72.8 | 13.2 | 13.5 | 2.5 | 75.1 | 11.7 | 12.4 | 2 | 82.8 | 10.4 | 10.7 | 1 |
| Chlorophyll | do | 75.4 | —9.3 | 15.8 | 4 | 82.2 | —7.5 | 13.6 | 3 | 86.6 | —7.1 | 11.9 | 2 | 85.5 | —6.0 | 11.3 | 1.5 |
| Do | do | 77.2 | —7.5 | 16.3 | 2 | 81.4 | —6.3 | 14.4 | 2.5 | 81.4 | —6.7 | 15.1 | 2.5 | 86.4 | —5.3 | 13.2 | 1 |
| Vitamin B₂ | do | 79.3 | —2.8 | 25.3 | 1 | 90.8 | —4.2 | 25.8 | 3 | 91.1 | —4.4 | 25.7 | 2.5 | 86 7 | —5.5 | 29.6 | 3.5 |
| Do | do | 84.7 | —7.6 | 25.4 | 1 | 88.7 | —4.2 | 25.8 | 3 | 90.1 | —3.8 | 23.3 | 2 | 90.4 | —3.5 | 22.8 | 1 |
| Paplica | do | 83.0 | —9.6 | 19.0 | 3 | 84.6 | 9.3 | 16.4 | 1 | 79.5 | 12.0 | 21.5 | 3.5 | 83.4 | 9.5 | 15.8 | 2 |
| Do | do | 86.2 | 7.3 | 17.9 | 2 | 76.3 | 13.4 | 23.9 | 5 | 77.0 | 12.8 | 24.2 | 5 | 75.2 | 13.5 | 24.0 | 4 |

EXAMPLE 3

Samples for test

β-Carotin ........................................ (1)
Chlorophyll ..................................... (2)
Vitamin B₂ ...................................... (3)
Paplica .......................................... (4)

Remarks:

In the column "hue," in case water is added in place of an aqueous solution having different value of pH which will be designated by the numeral 3.

fading ↔ coloring

2. Stability test for heat.

| Hue | | Preserving duration of— | | | | | | | | | | | | | | |
|---|---|---|---|---|---|---|---|---|---|---|---|---|---|---|---|---|
| | | 0 | | | | 1 | | | | 2 | | | | 3 | | |
| Coloring matter | Stabilizer | L | a | b | Hue | L | a | b | Hue | L | a | b | Hue | L | a | b | Hue |
| β-Carotin | Comparison, 1.6%. | 88.7 | 5.4 | 7.7 | 5 | 88.0 | 4.9 | 11.2 | 3 | 89.7 | 1.7 | 5.9 | 2 | 89.9 | 1.3 | 5.7 | 2 |
| Do | do | 84.7 | 5.2 | 8.9 | 5 | 89.8 | 1.9 | 7.4 | 4 | 91.5 | 0.9 | 6.4 | 2 | 92.1 | —0.6 | 4.5 | 1 |
| Chlorophyll | do | 84.6 | —6.5 | 10.4 | 5 | 87.2 | —6.1 | 10.4 | 3 | 87.6 | —5.2 | 8.8 | 3 | 88.0 | —4.4 | 8.1 | 2 |
| Do | do | 80.0 | —8.0 | 14.2 | 4 | 86.4 | —5.4 | 11.2 | 3 | 86.5 | —4.1 | 9.9 | 3 | 86.5 | —3.5 | 9.6 | 3 |
| Vitamin B₂ | do | 90.6 | —6.8 | 25.7 | 5 | 87.7 | 1.9 | 17.2 | 2 | 87.8 | 1.7 | 17.0 | 1 | 87.7 | 1.5 | 17.1 | 1 |
| Do | do | 87.0 | —7.5 | 31.4 | 5 | 86.3 | 1.2 | 20.4 | 1 | 85.6 | 1.9 | 19.5 | 1 | 85.0 | 2.4 | 19.1 | 1 |
| Paplica | do | 86.7 | 5.5 | 15.5 | 5 | 84.0 | 5.0 | 19.7 | 4 | 85.1 | 5.9 | 19.8 | 4 | 85.2 | 6.0 | 19.8 | 4 |
| Do | do | 83.7 | 9.2 | 19.9 | 5 | 84.6 | 8.5 | 18.2 | 3 | 85.4 | 8.3 | 17.8 | 3 | 85.5 | 7.7 | 18.5 | 3 |

Stabilizer for coloring matter

Mixture containing one part component of unsaponifiable matter of rice oil, 0.25 part of tocopherol and 0.05 part of lecithin is used by adding to the specimen at such percentage that in case of stability tests for heat and for ray of light, it is added at 16% while pH test, it is added at 20%.

Means for adding stabilizer and coloring matter

Test-solution is prepared by mixing one part of coloring matter specimen with 10 part of stabilizer for coloring matter, then 0.4 g. of said mixture is dissolved in 10 ml. of ethyl alcohol.

Test conditions

Hichrosuper cell (Cellact: Johns Manville Co.) of 25 g. is mixed with whole quantities of test solution, said mixture is sufficiently agitated and is weighed its homo- Remarks:

In the column "hue," in case, zero (0) hour is represented by the numeral "5," provided that chlorophyll becomes dark color simultaneously with adding treatment, the hue is designated by the numeral "4."

Moreover, change of hue as mentioned above, it is shown in the accompanying pictures substituting with FIGS. 6–11 of the drawings with reference to the comparison, comparative examples which are not added with stabilizer for coloring matter relating to the present invention and the addition (examples according to the present invention which are added with stabilizer for coloring matter relating to the present invention), those objects are compared after 0, 2, 4, 6, 8 and 10 hours respectively.

Stability test for ray of light.

| Coloring matter | Stabilizer | Hue | | | | Duration of exposure of— | | | | | | | | | | | |
|---|---|---|---|---|---|---|---|---|---|---|---|---|---|---|---|---|
| | | 0 | | | | 3 | | | | 4.5 | | | | 10 | | | |
| | | L | a | b | Hue | L | a | b | Hue | L | a | b | Hue | L | a | b | Hue |
| β-Carotin | Comparison 1.6% | 88.7 | 5.4 | 7.7 | 5 | 89.6 | 3.7 | 4.3 | 4 | 89.4 | 3.7 | 4.2 | 4 | 90.2 | 3.0 | 3.5 | 3 |
| Do | do | 84.7 | 5.2 | 8.9 | 5 | 88.9 | 4.1 | 7.5 | 5 | 88.5 | 3.7 | 7.5 | 5 | 88.4 | 3.4 | 7.2 | 5 |
| Chlorophyll | do | 84.6 | −6.5 | 10.4 | 5 | 89.3 | −4.1 | 7.8 | 4 | 87.7 | −3.9 | 9.3 | 3 | 90.4 | −2.1 | 5.5 | 2 |
| Do | do | 80.0 | −8.0 | 14.2 | 4 | 87.9 | −4.2 | 9.7 | 3 | 89.9 | −2.7 | 6.7 | 3 | 99.0 | −2.6 | 7.7 | 3 |
| Vitamin B₂ | do | 90.6 | −6.8 | 25.7 | 5 | 91.2 | −3.4 | 23.9 | 3 | 91.1 | −3.4 | 23.3 | 3 | 91.3 | −3.4 | 23.9 | 3 |
| Do | do | 87.0 | −7.5 | 31.4 | 5 | 99.0 | −3.0 | 23.1 | 3 | 89.8 | −2.9 | 23.0 | 3 | 99.6 | −2.7 | 22.8 | 3 |
| Paplica | do | 86.7 | 5.5 | 15.5 | 5 | 92.9 | 0.1 | 3.9 | 1 | 91.8 | −0.6 | 3.8 | 0 | 93.0 | −0.6 | 2.8 | 0 |
| Do | do | 83.7 | 9.2 | 19.9 | 5 | 85.8 | 8.7 | 18.3 | 5 | 85.7 | 8.5 | 17.7 | 5 | 85.8 | 7.6 | 16.7 | 5 |

Remarks:

In the column of "hue," in case zero (0) hour is represented by the numeral 5, chlorophyll is "4."

Change of hue caused by ray of light is shown in the accompanying pictures substituting with FIGS. 12–22 of the drawings referring to the comparison and the addition compared after 0, 1, 2, 3, 4, 5, 6, 7, 8, 9 and 10 hours respectively.

Remarks:

In the column "hue" section, the alphabet symbol "L" represents the brightness, and the brightest condition is indicated by the numeral 100 while the darkest condition is denoted by the numeral "0."

In the column of "a," the amount of value having the (+) sign represents "red" color and the value having the (−) sign represents "green" color while in the column of "b," the amount of value having the (+) sign represents "yellow" color and the value having the (−) sign represents "blue" color.

Appreciation of hue by means of visual observation is calculated through the appreciation process of the maximum at the point 5, and in case the comparison is appreciated as the point 5, the numeral 4 represents the condition which is recognized the tendency to become fading slightly and the numeral 3 represents the condition to have slightly been faded.

Furthermore, stabilizer for coloring matter in the present invention is found out, in the result of examination for rapid poisoning condition by using rats and mice prescribing stabilizer through their mouths, that no fatal case was occurred in the maximum prescription limit of 30 g./kg. to rats while 24 g./kg. to mice, and no change in an internal organs of the foregoing test animals was proved with the naked eyes by examination of dissection carried out one week after prescription.

Consequently, it is noticed that stabilizer for coloring matter according to the present invention is not poisonous rapidly by prescribing said stabilizer through their mouths.

EXAMPLE 4

Test example of Naocon as natural antioxidant applied to edibles prepared by oil treatment in the factory scale.

Addition of antioxidant.

Fats and fatty oils used at the stage of working treatment with oil preparation in a factory scale for manufacturing edibles is added with Naocon A or Naocon B at the rate of 0.2% respectively together with comparison.

Remarks:

Naocon A contains unsaponifiable matter of rice-bran, tocopherol and phosphoric acid.

Naocon B contains unsaponifiable matter of rice-bran, tocopherol and lecithin.

Test conditions:

Larmen is preserved at an isothermal temperature at 40° C. and frying oil is heated at the temperature ranging between 140° C. and 150° C.

Result (instant larmen)

| Antioxidant | Duration for preservation (by day) | | | | | |
|---|---|---|---|---|---|---|
| | 0 | | | 10 days | | |
| | Comparison | Naocon A | Naocon B | Comparison | Naocon A | Naocon B |
| Category of analysis: | | | | | | |
| Flavour | Very good | Very good | Very good | Very good | Very good | Very good |
| Lustre | do | do | do | do | do | Do. |
| Condition | do | do | do | do | do | Do. |
| AV | 0.22 | 0.30 | 0.28 | 0.06 | 0.26 | 0.23 |
| POV, meq./kg | 2.68 | 2.00 | 0.92 | 1.77 | 1.67 | 1.13 |

| Antioxidant | Duration for preservation (by day) | | | | | | | | |
|---|---|---|---|---|---|---|---|---|---|
| | 20 days | | | 30 days | | | 40 days | | |
| | Comparison | Naocon A | Naocon B | Comparison | Naocon A | Naocon B | Comparison | Naocon A | Naocon B |
| Category of analysis: | | | | | | | | | |
| Flavour | Very good | Very good | Very good | Faint smell of oxidation. | Very good | Very good | Smell of oxidation. | Very good | Very good. |
| Lustre | do | do | do | Very good | do | do | Pretty good | Pretty good | Pretty good. |
| Condition | do | do | do | do | do | do | do | do | Do. |
| AV | 0.20 | 0.27 | 0.25 | 0.32 | 0.25 | 0.21 | 0.51 | 0.23 | 0.21. |
| POV, meq./kg | 9.56 | 2.36 | 2.84 | 32.6 | 3.67 | 4.60 | 63.1 | 4.90 | 3.90. |

EXAMPLE 5

Anti-oxidation test of Naocons A type and B type in a factory scale for manufacturing frozen bean-curd.

Test conditions:

0.2% of Naocon is added to A type and B type respectively, $NH_3$ of 0.3% and Naocon of 0.2% are added together. Condition for preservation is kept at the temperature of 40° C.

| | | 0 day | 15 days | 30 days | 40 days | 50 day |
|---|---|---|---|---|---|---|
| Comparison | AV | 1.48 | 1.39 | 1.49 | 2.04 | 2.67 |
| | POV, meq./kg. | 9.70 | 10.2 | 14.7 | 26.8 | 39.1 |
| Naocon A, 0.2% | AV | 1.45 | 1.59 | 1.60 | 1.75 | 1.82 |
| | POV | 8.4 | 17.6 | 18.1 | 19.0 | 19.3 |
| Naocon A, 0.2% $NH_3$, 0.3% | AV | 1.54 | 1.36 | 1.55 | 1.67 | 1.82 |
| | POV | 6.92 | 12.4 | 18.10 | 22.9 | 26.7 |
| Naocon B, 0.2% | AV | 1.42 | 1.43 | 1.50 | 1.88 | 2.07 |
| | POV | 7.40 | 17.3 | 18.6 | 19.1 | 20.5 |
| $NH_3$, 0.3% | POV | 9.55 | 12.9 | 17.5 | 23.2 | 31.7 |
| Naocon B, 0.2% | AV | 1.37 | 1.27 | 1.38 | 1.40 | 1.4 |

EXAMPLE 6

Manufacturing oil-treated edibles by adding 0.2% of Naocon in A type an B type respectively together with comparison in a factory scale.

Temperature for preservation at 30° C. and margarine at 30° C.

amount of unsaponifiable matter of rice oil, calculated on the amount of lipid, is between about 0.01–2% by weight, while the amount of tocopherol, calculated on the amount of lipid, is about 0.01–1% by weight, the weight ratio of unsaponifiable matter of rice oil to tocopherol being 1:10 to 1:0.1.

| | Duration for preservation (by day) | | | | | |
|---|---|---|---|---|---|---|
| | 0 | | | 10 days | | |
| Antioxidant | Comparison | Naocon A | Naocon B | Comparison | Naocon A | Naocon B |
| Category of analysis: | | | | | | |
| Flavour | Very good | Very good | Very good | Very good | Very good | Very good. |
| Lustre | do | do | do | do | do | Do. |
| Condition | do | do | do | do | do | Do. |
| AV | 0.31 | 0.26 | 0.28 | 0.21 | 0.17 | 0.15. |
| POV, meq./kg | 1.50 | 1.05 | 1.40 | 0.57 | 0.33 | 0.50. |

| | Duration for preservation (by day) | | | | | | | | |
|---|---|---|---|---|---|---|---|---|---|
| | 20 days | | | 30 days | | | 40 days | | |
| Antioxidant | Comparison | Naocon A | Naocon B | Comparison | Naocon A | Naocon B | Comparison | Naocon A | Naocon B |
| Category of analysis: | | | | | | | | | |
| Flavour | Very good | Very good | Very good | Pretty good | Very good | Very good | Slightly smell of oxidation. | Very good | Very good. |
| Lustre | do | do | do | Very good | do | do | Very good | do | Do. |
| Condition | do | do | do | do | do | do | do | do | Do. |
| AV | 0.32 | 0.25 | 0.21 | 0.32 | 0.25 | 0.21 | 0.51 | 0.23 | 0.21. |
| POV, meg./kg | 1.77 | 1.67 | 1.33 | 22.4 | 17.5 | 14.1 | 36.3 | 21.3 | 16.9 |

What is claimed is:

1. A process of stabilizing lipids against oxidation, which comprises admixing lipid with an antioxidant composition consisting essentially of tocopherol, unsaponifiable matter of rice oil and a synergist selected from the group consisting of phophoric acid, lecithin and their functional derivatives.

2. A process of preventing discoloration of coloring matter, which comprises admixing the coloring matter with unsaponifiable matter of rice-bran, tocopherol and a synergist selected from the group consisting of phosphoric acid, lecithin and their functional derivatives.

3. A stabilized lipid composition consisting essentially of lipid, tocopherol, unsaponifiable matter of rice oil and a member selected from the group consisting of phosphoric acid, lecithin and their functional derivatives.

4. A composition as claimed in claim 3, wherein the

5. A stabilized composition of coloring matter consisting essentially of coloring matter, unsaponifiable matter of rice-bran, tocopherol and a member selected from the group consisting of phosphoric acid, lecithin and their functional derivatives.

References Cited
UNITED STATES PATENTS 2,526,865  10/1950  Gyorgy _____ 260—398.5
2,585,978  2/1952  Van Atta et al. _____ 260—398.5

ELBERT L. ROBERTS, Primary Examiner

U.S. Cl. X.R.

260—403